United States Patent
Drake et al.

(10) Patent No.: US 10,807,490 B2
(45) Date of Patent: Oct. 20, 2020

(54) INTERACTIVE CHARGING OF BATTERY-OPERATED VEHICLES

(71) Applicant: Disney Enterprises, Inc., Burbank, CA (US)

(72) Inventors: Corey D. Drake, Sunland, CA (US); Nicholas F. Barone, Glendale, CA (US); Clifford Wong, Burbank, CA (US); Jason A. Yeung, Glendale, CA (US); Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 91 days.

(21) Appl. No.: 16/162,157

(22) Filed: Oct. 16, 2018

(65) Prior Publication Data

US 2020/0114767 A1    Apr. 16, 2020

(51) Int. Cl.
*B60L 53/60* (2019.01)
*H02J 50/80* (2016.01)
*H02J 7/00* (2006.01)
*H02J 7/02* (2016.01)
*B60L 53/12* (2019.01)

(52) U.S. Cl.
CPC .............. *B60L 53/60* (2019.02); *B60L 53/12* (2019.02); *H02J 7/0047* (2013.01); *H02J 7/025* (2013.01); *H02J 50/80* (2016.02)

(58) Field of Classification Search
CPC ........ B60L 53/60; B60L 53/12; B60L 53/305; B60L 53/68; B60L 53/62; B60L 2200/10; B60L 2250/16; H02J 13/0075; H02J 13/0062; H02J 7/042; H02J 7/0021; H02J 7/025; H02J 7/34; H02J 13/00001; H02J 7/0029; H02J 7/00302; H02J 7/00304; H02J 7/00306; H02J 7/0047; H02J 50/80; H05B 47/22

See application file for complete search history.

(56) References Cited

U.S. PATENT DOCUMENTS

| | | | | |
|---|---|---|---|---|
| 5,698,961 | A * | 12/1997 | Kutz | G01R 31/3004 320/125 |
| 9,168,834 | B2 * | 10/2015 | Yashiro | B60L 1/003 |
| 9,214,822 | B2 * | 12/2015 | Hartley | B60L 3/0038 |
| 9,493,232 | B2 * | 11/2016 | Wang | G05D 1/0016 |
| 9,531,208 | B2 | 12/2016 | Haseltine et al. | |

(Continued)

*Primary Examiner* — Helen Rossoshek
(74) *Attorney, Agent, or Firm* — Patterson + Sheridan, LLP (57) ABSTRACT

A method and associated computer program product and system are disclosed. The method comprises, while a battery-operated vehicle is not being charged by a power supply, receiving a first input at a user interface displayed on a computing device. The method further comprises, responsive to the first input, wirelessly transmitting a first control signal to the battery-operated vehicle to control motive operation thereof. The method further comprises, responsive to receiving an indication that the battery-operated vehicle is being charged by the power supply, displaying one or more tasks to be completed using the user interface. The method further comprises receiving a second input at the user interface while the one or more tasks are displayed, and responsive to the second input, wirelessly transmitting a second control signal to operate one or more output devices of the battery-operated vehicle.

20 Claims, 9 Drawing Sheets

(56) References Cited

U.S. PATENT DOCUMENTS

| | | | | |
|---|---|---|---|---|
| 9,758,046 B2* | 9/2017 | Harper | | B60L 53/68 |
| 9,815,382 B2* | 11/2017 | Penilla | | B60L 11/1848 |
| 10,090,567 B2* | 10/2018 | Austin | | H01M 10/44 |
| 10,137,984 B1* | 11/2018 | Flick | | B64D 47/00 |
| 2005/0127866 A1 | 6/2005 | Hamilton et al. | | |
| 2007/0114967 A1 | 5/2007 | Peng | | |
| 2009/0040029 A1* | 2/2009 | Bridges | | G06Q 50/06 |
| | | | | 340/12.37 |
| 2010/0153039 A1* | 6/2010 | Raichle | | H01M 10/46 |
| | | | | 702/63 |
| 2011/0156640 A1 | 6/2011 | Moshfeghi | | |
| 2011/0187377 A1* | 8/2011 | Boysen | | G01R 31/36 |
| | | | | 324/426 |
| 2014/0176061 A1 | 6/2014 | Cheatham, III et al. | | |
| 2016/0087490 A1* | 3/2016 | Tuerk | | H02J 7/042 |
| | | | | 702/58 |
| 2016/0144728 A1* | 5/2016 | Harper | | B60L 53/68 |
| | | | | 320/109 |
| 2016/0336772 A1* | 11/2016 | Dallachiesa | | H02J 7/0034 |
| 2017/0101120 A1* | 4/2017 | Hannah | | B62B 5/0033 |
| 2018/0035606 A1* | 2/2018 | Burdoucci | | A01D 34/008 |
| 2018/0280782 A1* | 10/2018 | Lagree | | A63B 71/0619 |
| 2020/0006988 A1* | 1/2020 | Leabman | | H02J 50/20 |
| 2020/0055418 A1* | 2/2020 | Bridges | | B60L 53/00 |

* cited by examiner

INTERACTIVE CHARGING OF BATTERY-OPERATED VEHICLES

BACKGROUND

The present disclosure relates to techniques for interactive charging of battery-operated vehicles.

Despite improvements in battery technology and electronic components having reduced power consumption, battery-operated vehicles require a significant amount of time for charging the battery relative to the time that the vehicles may be operated. In some cases, the time needed to fully recharge the battery may exceed the operational time. For example, a drone may require thirty (30) minutes to recharge the battery following ten (10) minutes of flight operation. Further, battery-operated vehicles may have limited (or no) functionality for users while charging.

SUMMARY

According to one embodiment, a method comprises, while a battery-operated vehicle is not being charged by a power supply, receiving a first input at a user interface displayed on a computing device. The method further comprises, responsive to the first input, wirelessly transmitting a first control signal to the battery-operated vehicle to control motive operation thereof. The method further comprises, responsive to receiving an indication that the battery-operated vehicle is being charged by the power supply, displaying one or more tasks to be completed using the user interface. The method further comprises receiving a second input at the user interface while the one or more tasks are displayed, and responsive to the second input, wirelessly transmitting a second control signal to operate one or more output devices of the battery-operated vehicle.

According to another embodiment, a computer program product comprising a computer-readable storage medium having program instructions embodied therewith. The program instructions are executable by one or more computer processors to perform an operation for controlling operation of a battery-operated vehicle. The operation comprises displaying a user interface at a display coupled with the one or more computer processors. The operation further comprises, while the battery-operated vehicle is not being charged by a power supply, receiving a first input at the user interface. The operation further comprises, responsive to the first input, wirelessly transmitting a first control signal to the battery-operated vehicle to control motive operation thereof. The operation further comprises, responsive to receiving an indication that the battery-operated vehicle is being charged by the power supply, displaying one or more tasks to be completed using the user interface. The operation further comprises receiving a second input at the user interface while the one or more tasks are displayed, and responsive to the second input, wirelessly transmitting a second control signal to operate one or more output devices of the battery-operated vehicle.

According to another embodiment, a system comprises a battery-operated vehicle comprising a battery, a charging interface coupled with the battery, a communications interface, and an output device. The system further comprises a power supply configured to couple with the charging interface, a display, and one or more computer processors. The one or more computer processors are configured to display a user interface using the display. The one or more computer processors are further configured to, while the battery is not being charged by the power supply, receive a first input at the user interface. The one or more computer processors are further configured to, responsive to the first input, wirelessly transmit a first control signal to the communications interface to control motive operation of the battery-operated vehicle. The one or more computer processors are further configured to, responsive to receiving an indication that the battery is being charged by the power supply, display one or more tasks to be completed using the user interface. The one or more computer processors are further configured to receive a second input at the user interface while the one or more tasks are displayed, and responsive to the second input, wirelessly transmit a second control signal to the communications interface to operate the output device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments discussed herein include a method comprising, while a battery-operated vehicle is not being charged by a power supply, receiving a first input at a user interface displayed on a computing device. Responsive to the first input, a first control signal is wirelessly transmitted to the battery-operated vehicle to control motive operation thereof. Responsive to receiving an indication that the battery-operated vehicle is being charged by the power supply, one or more tasks to be completed using the user interface are displayed. A second input is received at the user interface while the one or more tasks are displayed. Responsive to the second input, a second control signal is wirelessly transmitted to operate one or more output devices of the battery-operated vehicle.

Beneficially, displaying the one or more tasks and the operation of the one or more output devices while the battery-operated vehicle is being charged tends to increase a user interest and/or user engagement with the battery-operated vehicle, even in cases when the primary operation of the battery-operated vehicle is unavailable. For example, a drone may be unable to fly when plugged into a power supply, and a user might ordinarily do something else unrelated to the drone during the time that the drone is charging. By prescribing the one or more tasks for the user to complete, in conjunction with the one or more output devices of the battery-operated vehicle, the user may remain engaged with the battery-operated vehicle.

In some embodiments, the second control signal configures a controller of the battery-operated vehicle to adjust a charging rate of the battery. In some embodiments, one or more tasks are displayed at the user interface responsive to receiving the indication that the battery-operated vehicle is being charged by the power supply. Responsive to the second input, performance of the one or more tasks is assessed, and an adjustment to the charging rate is determined based on the assessed performance.

Beneficially, prescribing the one or more tasks while the battery-operated vehicle is being charged tends to increase a user interest and/or user engagement with the battery-operated vehicle, even for cases when the primary operation of the battery-operated vehicle is unavailable. Control of the charging rate based on the assessed performance of the one or more tasks tends to further increase a user interest and/or user engagement with the battery-operated vehicle, as a user may be incentivized to successfully perform or complete the one or more tasks to ensure that the battery-operated vehicle charges as quickly as possible.

Figure 1:
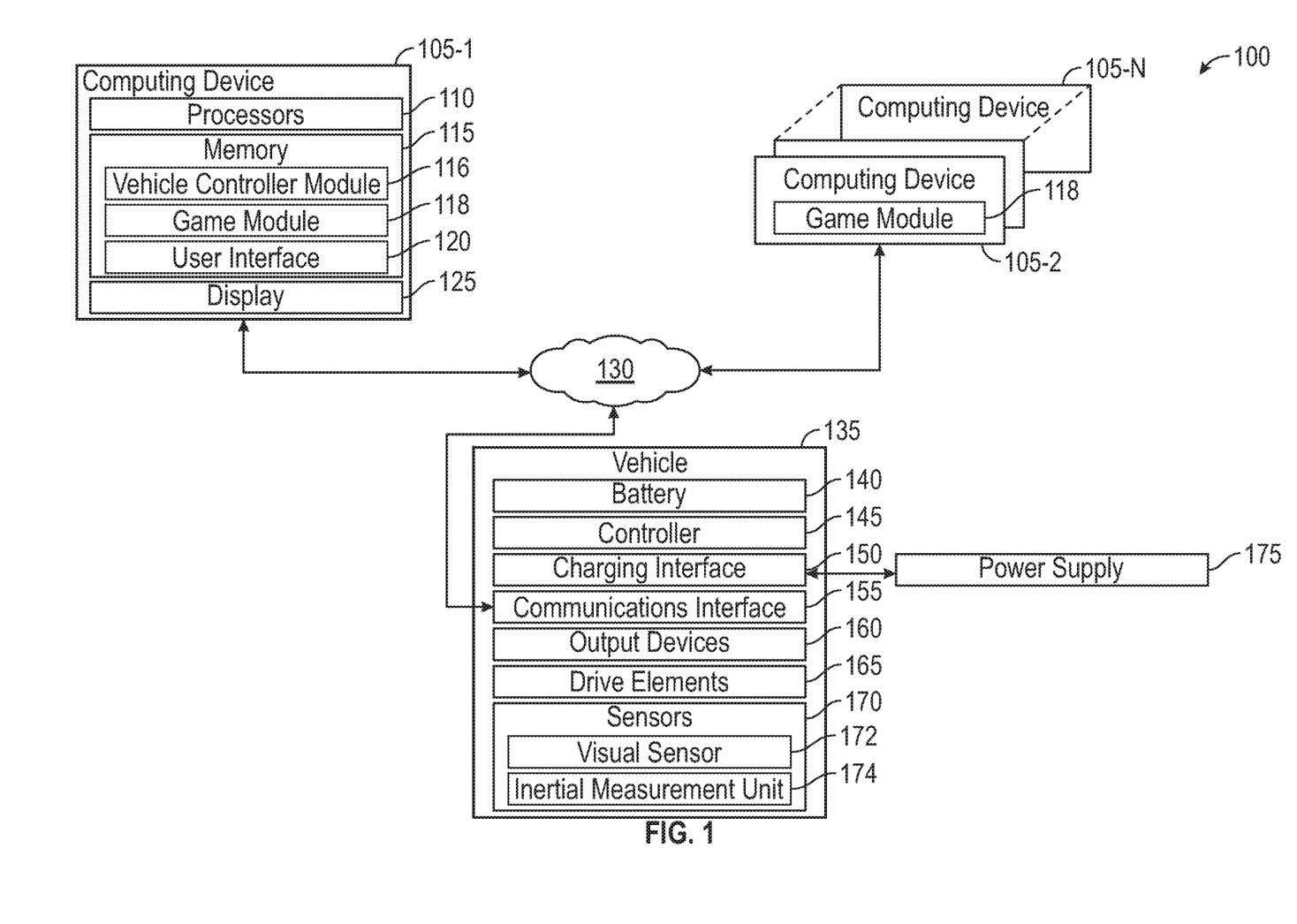
FIG. 1 is a block diagram illustrating an exemplary system comprising a battery-operated vehicle, according to one or more embodiments.

FIG. 1 is a block diagram illustrating an exemplary system 100 comprising a battery-operated vehicle 135 (also referred to as vehicle 135), according to one or more embodiments. The vehicle 135 may be implemented in any suitable form. Some non-limiting examples of the vehicle 135 include remotely-controllable fixed wing aircraft and rotary wing aircraft (e.g., drones or unmanned aerial vehicles (UAVs)), remotely-controllable cars or other wheeled or tracked vehicles (e.g., unmanned ground vehicles (UGVs)) whether on-road or off-road, remotely-controllable watercraft, remotely-controllable rail vehicles, and so forth. Further, the vehicle 135 may encompass other remotely-controllable devices having one or more drive elements 165. In one embodiment, the vehicle 135 may be implemented as a robot toy having drive wheels.

The vehicle 135 comprises a battery 140 including any type of rechargeable energy storage, such as conventional rechargeable battery technologies (e.g., lead acid, nickel cadmium (NiCd), nickel metal hydride (NiMH), and lithium ion batteries), inductive energy storage technologies, capacitive energy storage technologies, and so forth. The battery 140 may be comprised of one or more rechargeable devices, and may also be comprised of different devices (e.g., a bank of capacitors in combination with a NiMH battery). The battery 140 may be implemented in any suitable form. In some embodiments, the battery 140 is integrated into the vehicle 135 and is not intended for frequent removal or replacement. In other embodiments, the battery 140 is removable.

The vehicle 135 further comprises a controller 145 having circuitry configured to control motive operation of the vehicle 135 via one or more drive elements 165. Some non-limiting examples of the drive elements 165 include electric motors coupled with wheels, tracks, or rotors. The controller 145 may be implemented in any suitable form, such as a microprocessor, a digital signal processor (DSP), an application-specific integrated chip (ASIC), and a field programmable gate array (FPGA), or combinations thereof.

In some embodiments, the controller 145 is configured to perform one or more battery management functions for controlling and/or limiting the operation of the battery 140. For example, the controller 145 may set a charging rate, a discharging rate, a charging rate limit, and/or a discharging rate limit of the battery 140.

The vehicle 135 further comprises a charging interface 150 that is configured to receive power from a power supply 175, and to deliver some or all of the received power to the battery 140. Some non-limiting examples of the charging interface 150 include conductive wired connections, wireless connections (e.g., inductive charging), optical connections, and so forth. The charging interface 150 may have any suitable form for receiving power from the power supply 175, whether standardized or proprietary.

The energy source of the power supply 175 may have any suitable form, such as a wall power connection, an alternating current (AC) adapter, an external battery pack, a solar panel, and so forth. In some embodiments, the power supply 175 has a form factor that is dimensioned to mate with the vehicle 135, e.g., a docking station. The power supply 175 may be dimensioned such that the vehicle 135 and the power supply 175 have a predefined arrangement when mated. In some cases of a non-wired charging interface 150 (e.g., wireless connections, optical connections), the vehicle 135 and the power supply 175 are aligned when in the predefined arrangement, allowing increased power transfer rates. In some cases, the power supply 175 includes one or more features for retaining the vehicle 135 in the predefined arrangement. In some embodiments, the controller 145 is coupled with the charging interface 150 and controls or limits the power supplied to the battery 140 from the charging interface 150.

The controller 145 is further coupled with a communications interface 155 that supports wireless communications between the controller 145 and one or more computing devices 105-1, 105-2, . . . , 105-N via a network 130. The network 130 may include one or more networks of various types, including a local area or local access network (LAN), a general wide area network (WAN), and/or a public network (e.g., the Internet). In some embodiments, the network 130 comprises a decentralized, wireless ad hoc network that may support dynamic changes to the composition of the system 100. Other functionality of the controller 145 is also contemplated.

The vehicle 135 comprises one or more output devices 160 that are observable by a user. Some non-limiting examples of the one or more output devices 160 comprise a visual output device (e.g., a light-emitting diode (LED) indicator), an audible output device (e.g., a speaker), a haptic output device, and so forth. In some embodiments, the one or more output devices 160 include the drive elements 165, and operating the one or more output devices 160 comprises momentarily operating a drive element of the vehicle 135 without disrupting the coupling of the power supply 175 with the vehicle 135.

Figure 11:
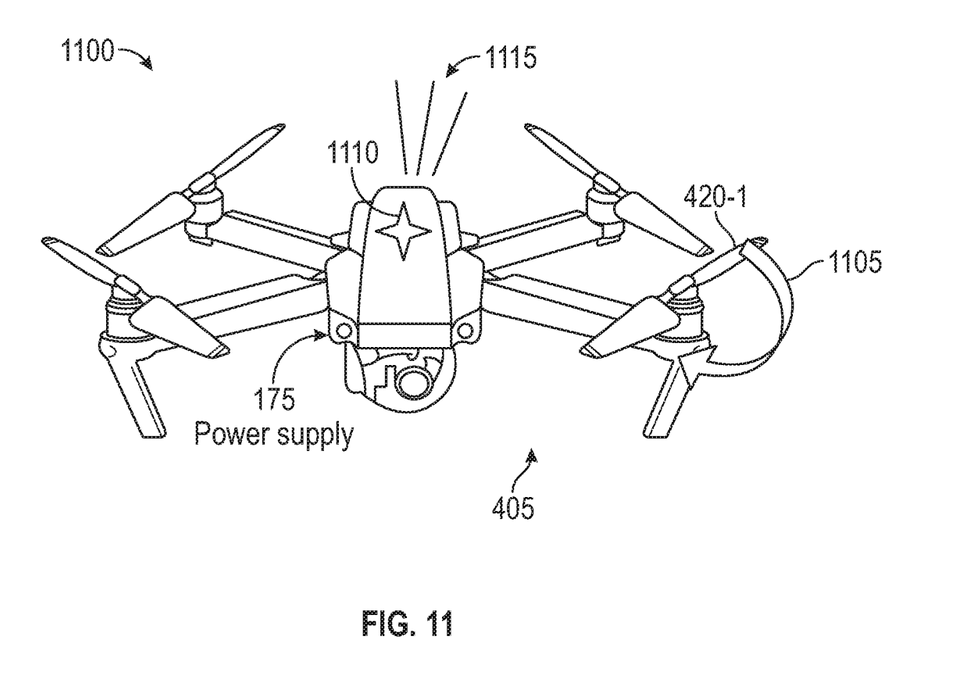
FIG. 11 illustrates operating an output device of a battery-operated vehicle, according to one or more embodiments.

FIG. 11 illustrates operating the one or more output devices 160 of the vehicle 135. In the diagram 1100, the power supply 175 is coupled with a drone 405 (one example of the vehicle 135), such as being plugged in, mated, or docked.

The computing device 105-1 (such as the game module 118, discussed below) may present one or more tasks to be completed by a user. Responsive to the inputs, the drone 405 may provide an audio output 1115 and/or a visual output 1110 based on an assessment of the user's performance of the tasks. For example, the LED indicator on the drone 405 blinks when a task has been completed successfully. Other output examples include haptics (vibrations) and other lighting effects.

In some embodiments, operating the one or more output devices 160 comprises momentarily operating a drive element 165 of the battery-operated vehicle without disrupting the coupling of the power supply with the battery-operated vehicle. In the diagram 1100, a rotor 420-1 of the drone 405 is rotated 1105 based on an assessment of the user's performance of the tasks. For example, the rotor 420-1 may have experienced virtual damage, and is rotated 1105 responsive to successful performance of the tasks to "repair" the virtual damage.

Returning to FIG. 1, the vehicle 135 comprises one or more sensors 170 configured to provide sensor input describing aspects of the vehicle 135 and/or the environment in which the vehicle 135 is operated. The one or more sensors 170 are coupled with the controller 145 and/or the communications interface 155, via which the sensor input is communicated to the one or more computing devices 105-1, 105-2, . . . , 105-N via the network 130. The one or more sensors 170 may be integrated with, or externally attached to, the vehicle 135. In some embodiments, at least one of the one or more sensors 170 is removably coupled with the vehicle 135. Some non-limiting examples of the one or more sensors 170 comprise a visual sensor 172 such as a visual camera or an infrared camera, an inertial measurement unit 174 (comprising at least one of an accelerometer, a gyroscope, and a magnetometer), a geolocation system such as Global Positioning System (GPS), and so forth.

The computing device 105-1 may be implemented in any suitable form. In some embodiments, the computing device 105-1 comprises a mobile computing device that is handheld (e.g., a smartphone, a tablet) or body-wearable (e.g., an arm-worn device such as a watch, a head-worn device such as an eyepiece). Other types of the computing device 105-1 are also possible, such as a desktop computer and a laptop computer. Other examples of the computing device 105-1 include remote terminals, kiosks, video game machines, and media devices (including recorders, editors, and players such as televisions, set-top boxes, music players, digital photo frames, and digital cameras).

The computing device 105-1 comprises one or more computer processors 110 representing any number of processing elements that each can include any number of processing cores. Some non-limiting examples of the one or more computer processors 110 include a microprocessor, a digital signal processor (DSP), an application-specific integrated chip (ASIC), and a field programmable gate array (FPGA), or combinations thereof.

The computing device 105-1 further comprises a memory 115, which may comprise volatile memory elements (such as random access memory (RAM)), non-volatile memory elements (such as solid-state, magnetic, optical, or Flash-based storage), and combinations thereof. Moreover, the memory 115 may be distributed across different mediums (e.g., RAM, Flash memory, hard drive).

The memory 115 may comprise one or more "modules" for performing various functions described herein. In one embodiment, each module includes program code that is executable by one or more of the processing units (e.g., the one or more computer processors 110). However, other embodiments may include modules that are partially or fully implemented in hardware (i.e., circuitry) or firmware of the computing device 105-1. As shown, the memory 115 comprises a vehicle controller module 116 and a game module 118, which are discussed further below.

The memory 115 further comprises a user interface 120 configured to display graphical elements using a display 125. The display 125 includes any type of dynamic display capable of displaying a visual interface to a user, and may include any type of light emitting diode (LED), organic LED (OLED), liquid crystal display (LCD), plasma, electroluminescence (EL), or other display technology. In some body-wearable implementations of the computing device 105-1, the display 125 is see-through display that permits a user to view the environment through the display 125. In other body-wearable implementations of the computing device 105-1, imagery from the display 125 is directed onto the user's field of view using optical elements such as beam-splitters.

The computing device 105-1 further comprises an input device 126 configured to receive inputs from a user to interact with the user interface 120. In some embodiments, the input device 126 comprises a touch screen comprising any suitable sensing technology (e.g., capacitive, resistive, inductive, and so forth). In some embodiments, the touch screen overlaps with the display 125. The touch screen may be integrated with, or entirely separate from, the display 125. Other types of input sensing are also contemplated for the input device 126. One alternate example of the input device 126 includes a visual sensor (e.g., a camera) that is configured to detect user motions such as hand gestures (such as sign language) or face tracking. Another alternate example of the input device 126 includes an audio sensor (e.g., a microphone) that is configured to detect user-made sounds such as speech.

In some embodiments, the user interface 120 is operated in different modes based on the operational status of the vehicle 135. Different graphical elements may be displayed in the user interface 120 depending on the mode. In some embodiments, the user interface 120 is operated in a first mode when the vehicle 135 is not being charged by the power supply 175, and is operated in a second mode when the vehicle 135 is being charged by the power supply 175. In one embodiment, the user interface 120 exclusively displays graphical elements used to control motive operation of the vehicle 135 in the first mode (e.g., a vehicle control mode), and exclusively displays graphical elements that do not control the motive operation in the second mode (e.g., a gameplay mode). In this embodiment, the user interface 120 may display graphical elements associated with the vehicle controller module 116 in the first mode, and may display graphical elements associated with the game module 118 in the second mode.

In another embodiment, the graphical elements displayed on the user interface 120 in the first mode and/or in the second mode are non-exclusive. Stated another way, at least one of the first mode and the second mode may combine vehicle control and gameplay. For example, the first mode may include graphical elements for controlling the motive operation of the vehicle 135 as well as gameplay graphical elements.

The vehicle controller module 116 is configured to control motive operation of the vehicle 135. In some embodiments, the vehicle controller module 116 receives inputs from a user at the user interface 120 (via the input device 126), and generates control signals to control motive operation of the vehicle 135. The control signals are transmitted to the vehicle 135 via the network 130.

The game module 118 provides a gameplay environment for the user having any suitable form, such as an action game, an adventure game, a role-playing game, a simulation game, a strategy game, a sports game, a party game, a trivia game, an educational game, and so forth. In some embodiments, the game module 118 provides an augmented reality (AR) experience that combines physical elements (e.g., the vehicle 135) with virtual elements displayed on the display 125. In some embodiments, the game module 118 receives inputs from a user at the user interface 120 (via the input device 126). In some embodiments, the game module 118 generates control signals to operate one or more output devices of the vehicle 135. The control signals are transmitted to the vehicle 135 via the network 130.

In some embodiments, the game module 118 prescribes one or more tasks that are displayed at the user interface 120. The user performs the one or more tasks through inputs provided to the input device 126. In some embodiments, the game module 118 assesses performance of the one or more tasks, and may transmit control signals to the drive elements 165 and/or the one or more output devices 160 based on the assessed performance.

In some embodiments, the game module 118 operates independent of the motive control of the vehicle 135. In other embodiments, the game module 118 operates in conjunction with the vehicle controller module 116 (e.g., the motive operation or operational state of the vehicle 135 impacts gameplay).

Each of the computing devices 105-2, . . . , 105-N includes components similar to the computing device 105-1, such as one or more computer processors, a memory, and an input device. The computing devices 105-2, . . . , 105-N may be implemented in the same form as the computing device 105-1, or in different forms.

In some embodiments, the computing devices 105-2, . . . , 105-N comprise game modules 118 that communicate with each other via the network 130 (e.g., a multiplayer game). In one example, while the vehicle 135 is being charged by the power supply 175, different users may compete with each other via the game modules 118 to determine which user can control motive operation of the vehicle 135 upon completion of the charging. In another example, each of the computing devices 105-2, . . . , 105-N operates a different vehicle and the game modules 118 communicate with each other (e.g., the motive operation or operational state of different vehicles impacts gameplay).

Figure 2:
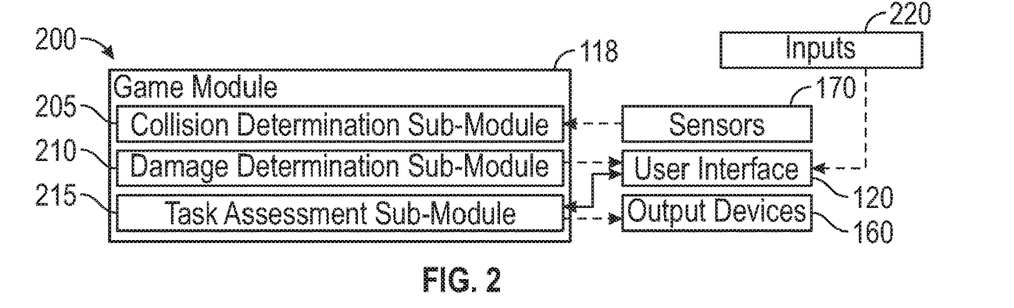
FIG. 2 is a block diagram illustrating operation of an exemplary game module, according to one or more embodiments.

FIG. 2 is a block diagram 200 illustrating operation of an exemplary game module 118, according to one or more embodiments. The features depicted in the block diagram 200 may be used in conjunction with other embodiments, such as the vehicle 135 of FIG. 1.

During motive operation of the vehicle, a user provides one or more inputs 220 to the user interface 120 to control the motive operation. In some embodiments, controlling the motive operation of the vehicle occurs in a first mode of the user interface 120. One or more sensors 170 of the vehicle may provide sensor input characterizing the motive operation to the game module 118. In some embodiments, the sensor input may be provided to a collision determination sub-module 205 that is configured to determine, using the sensor input, whether or not a collision of the vehicle has occurred. For example, a deceleration value received from an accelerometer that exceeds a threshold value may indicate that the vehicle has collided with an object in the environment. In some embodiments, the collision determination sub-module 205 is further configured to characterize the collision, such as a location of the collision (e.g., describing a component or region of the vehicle involved in the collision), a severity of the collision, and so forth.

Figure 8:
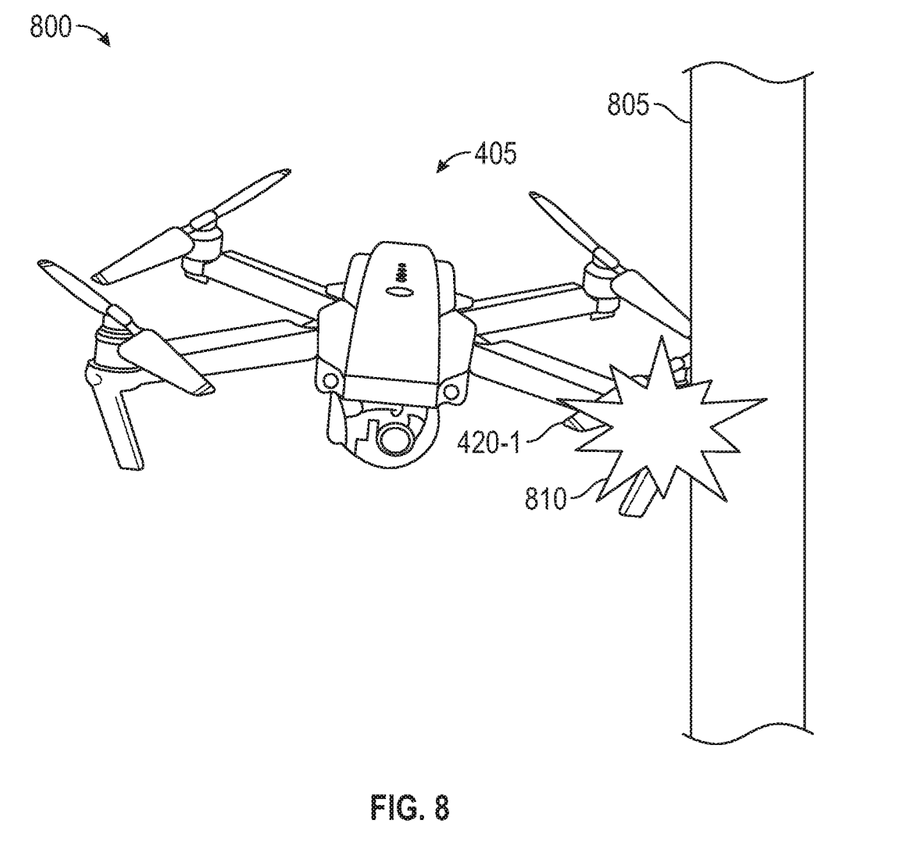
FIG. 8 illustrates an exemplary collision of a battery-operated vehicle, according to one or more embodiments.

An exemplary collision of the vehicle 135 is illustrated in FIG. 8. The features of diagram 800 may be used in conjunction with other embodiments, such as using a drone 405 discussed below with respect to FIG. 4. In the diagram 800, a collision 810 occurs between the drone 405 (and more specifically, a rotor 420-1 of the drone 405) during flight and an object 805.

Returning to FIG. 2, in some embodiments, the game module 118 comprises a damage determination sub-module 210 that determines an amount of virtual damage associated with the collision. For example, the damage determination sub-module 210 may accumulate virtual damage for different components or regions of the vehicle, based on a number of collisions of the vehicle reported by the collision determination sub-module 205. In one alternate implementation, the virtual damage is determined based on gameplay (e.g., an AR depiction of the vehicle incurred damage after being blasted by an opponent). The virtual damage information may be provided to the user interface 120 and displayed to a user.

In some embodiments, the game module 118 comprises a task assessment sub-module 215 that prescribes one or more tasks to be performed by a user. The task assessment sub-module 215 displays the one or more tasks at the user interface 120. In some embodiments, the one or more tasks are displayed in a second mode of the user interface 120.

Inputs 220 provided by a user during the second mode are communicated to the task assessment sub-module 215, and the one or more output devices 160 are operated in response to the inputs 220. The task assessment sub-module 215 assesses the user's performance of the one or more tasks based on the inputs 220, and the one or more output devices 160 are operated in response to the inputs 220. For example, responsive to successful completion of a task, the one or more output devices 160 may provide one or more of a visual output, an audible output, and a haptic output.

In some embodiments, the inputs 220 operate to "repair" the virtual damage for the different components or regions of the vehicle, based on the assessed performance. Although not shown, a charging rate of a battery of the vehicle may be controlled based on the assessed performance of the one or more tasks (or based on the virtual damage repair). In some embodiments, the charging rate is increased responsive to successful completion of a task. In some embodiments, the charging rate is decreased (or remains the same) responsive to unsuccessful completion of the task. In some embodiments, the controlled charging rate of the battery is a virtual charging rate (e.g., an actual charging rate of the battery is not affected by the assessed performance of the one or more tasks).

Figure 3:
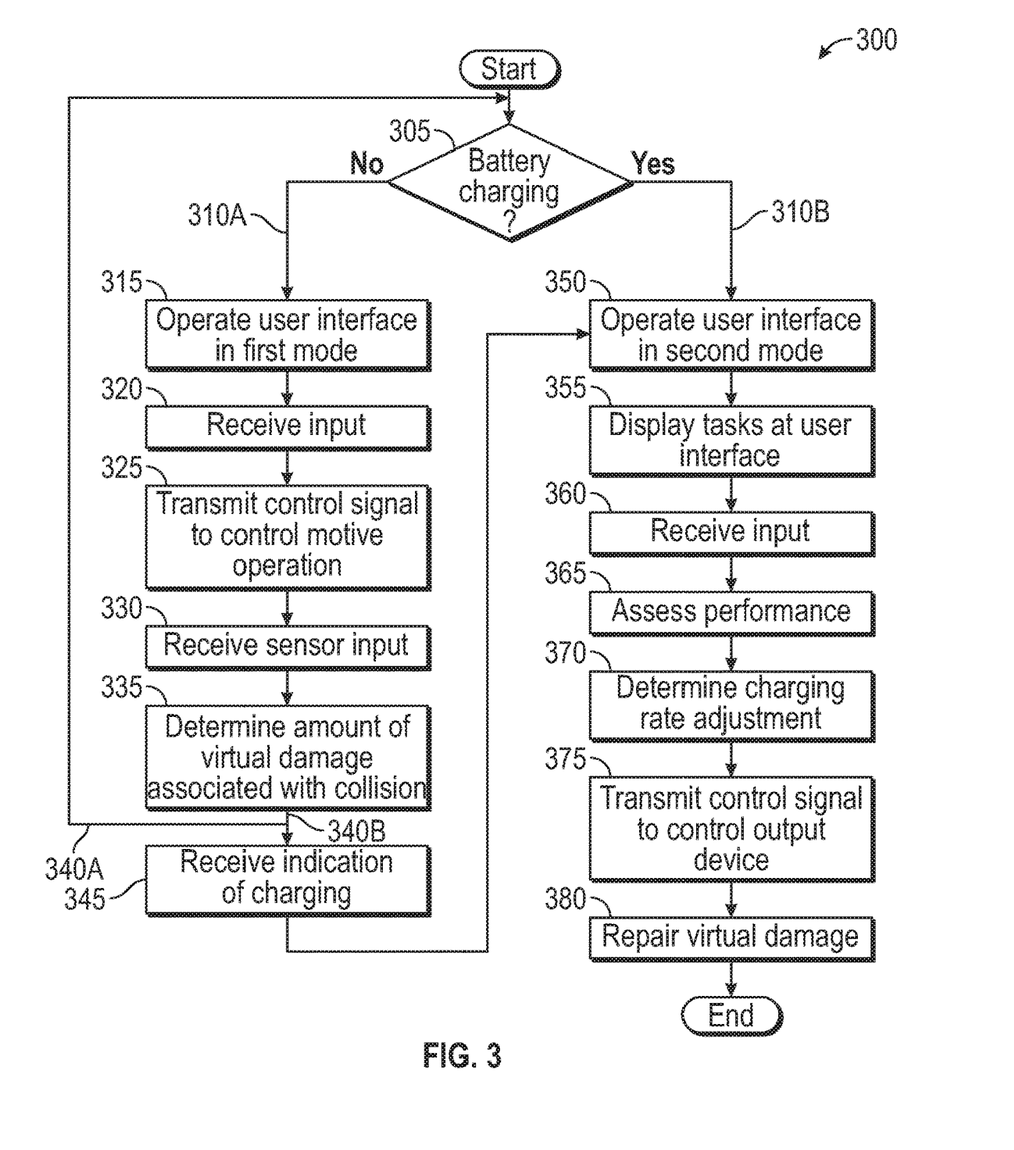
FIG. 3 is a method of interactive charging of a battery-operated vehicle, according to one or more embodiments.

FIG. 3 is a method 300 of interactive charging of a battery-operated vehicle, according to one or more embodiments. The method 300 may be used in conjunction with other embodiments, such as being performed using the computing device 105-1 of FIG. 1.

The method 300 begins at block 305, where the computing device determines whether the battery of the vehicle is being charged by a power supply. If the battery is not being charged ("NO"), the method 300 proceeds along branch 310A to block 315, where a user interface of the computing device is operated in a first mode. In some embodiments, the first mode corresponds to a dedicated vehicle control mode that controls motive operation of the vehicle.

At block 320, an input is received at the user interface. At block 325, the computing device transmits a control signal to control motive operation of the vehicle. At block 330, the computing device receives a sensor input from the vehicle. In some embodiments, the sensor input indicates a collision of the vehicle with an object in the environment.

At block 335, the computing device determines an amount of virtual damage associated with the collision. In one embodiment, the method 300 proceeds along branch 340A to return to block 305. In another embodiment, the method 300 proceeds along branch 340B to block 345, where the computing device receives an indication that the battery is being charged.

If the battery is being charged ("YES"), the method 300 proceeds along branch 310B to block 350. Alternatively, the method 300 proceeds to block 350 from block 345. At block 350, the user interface of the computing device is operated in a second mode. In some embodiments, the second mode corresponds to a game mode that provides a gameplay environment using the computing device, and which may or may not provide control for motive operation of the vehicle.

At block 355, one or more tasks are displayed at the user interface. At block 360, an input is received at the user interface. At block 365, the computing device assesses performance of the one or more tasks based on the received input. At block 370, the computing device determines an adjustment to a charging rate of the battery based on the assessed performance.

At block 375, the computing device transmits a control signal to control one or more output devices of the vehicle. In some embodiments, the second control signal configures the controller to adjust the charging rate of the battery.

At block 380, the computing device repairs virtual damage associated with the collision, based on the assessed performance. Method 300 ends following completion of block 380.

Figure 4:
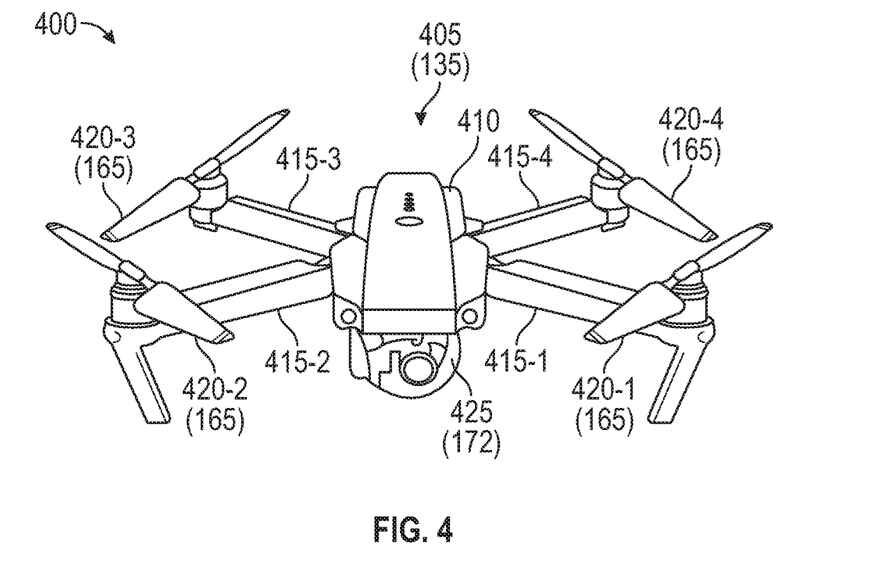
FIGS. 4 and 5 illustrate exemplary battery-operated vehicles, according to one or more embodiments.
Figure 5:
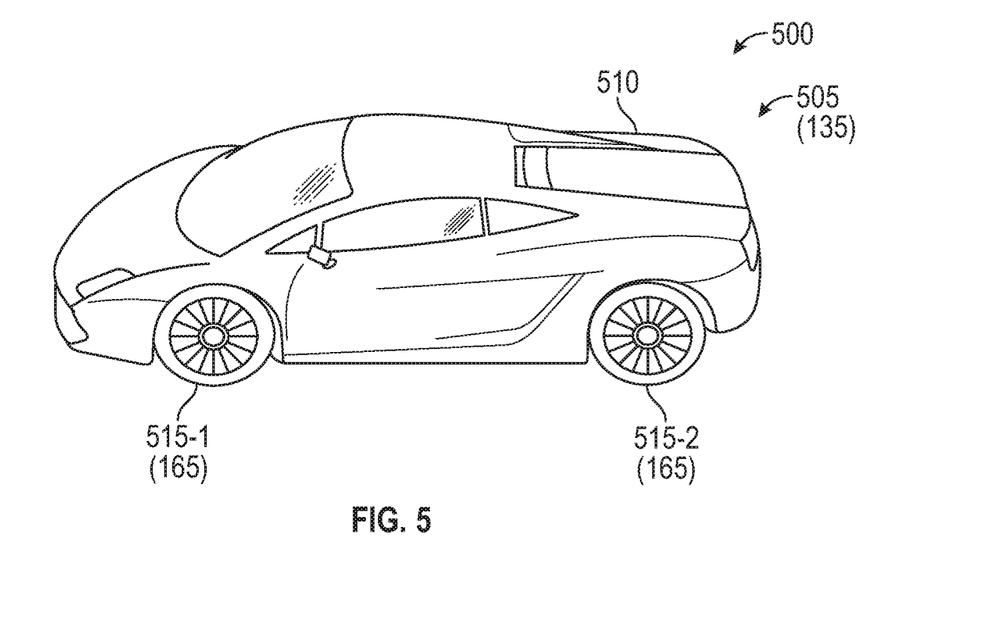

FIGS. 4 and 5 illustrate exemplary battery-operated vehicles, according to one or more embodiments. The features shown in FIGS. 4 and 5 may be used in conjunction with other embodiments, such as being controlled using the computing device 105-1 of FIG. 1.

In diagram 400, a drone 405 provides one example of the vehicle 135 of FIG. 1. The drone 405 comprises a body 410 that may house other components, such as a controller, sensors, output devices, and/or other circuitry or components. A plurality of arms 415-1, 415-2, 415-3, 415-4 extend from the body 410. Each of the plurality of arms 415-1, 415-2, 415-3, 415-4 is attached to a respective rotor of a plurality of rotors 420-1, 420-2, 420-3, 420-4. The plurality of rotors 420-1, 420-2, 420-3, 420-4 are examples of the drive elements 165 of FIG. 1. The arms 415-1, 415-2, 415-3, 415-4 are dimensioned such that the rotor planes of the plurality of rotors 420-1, 420-2, 420-3, 420-4 are not overlapping. The drone 405 further comprises a camera 425 attached to the body 410. The camera 425 is an example of the visual sensor 172 of FIG. 1.

In diagram 500, a remote control car 505 provides another example of the vehicle 135 of FIG. 1. The remote control car 505 comprises a body 510 that may house other components, such as a controller, sensors, output devices, and/or other circuitry or components. Two wheels 515-1, 515-2 are shown, which are examples of the drive elements 165 of FIG. 1.

Figure 6:
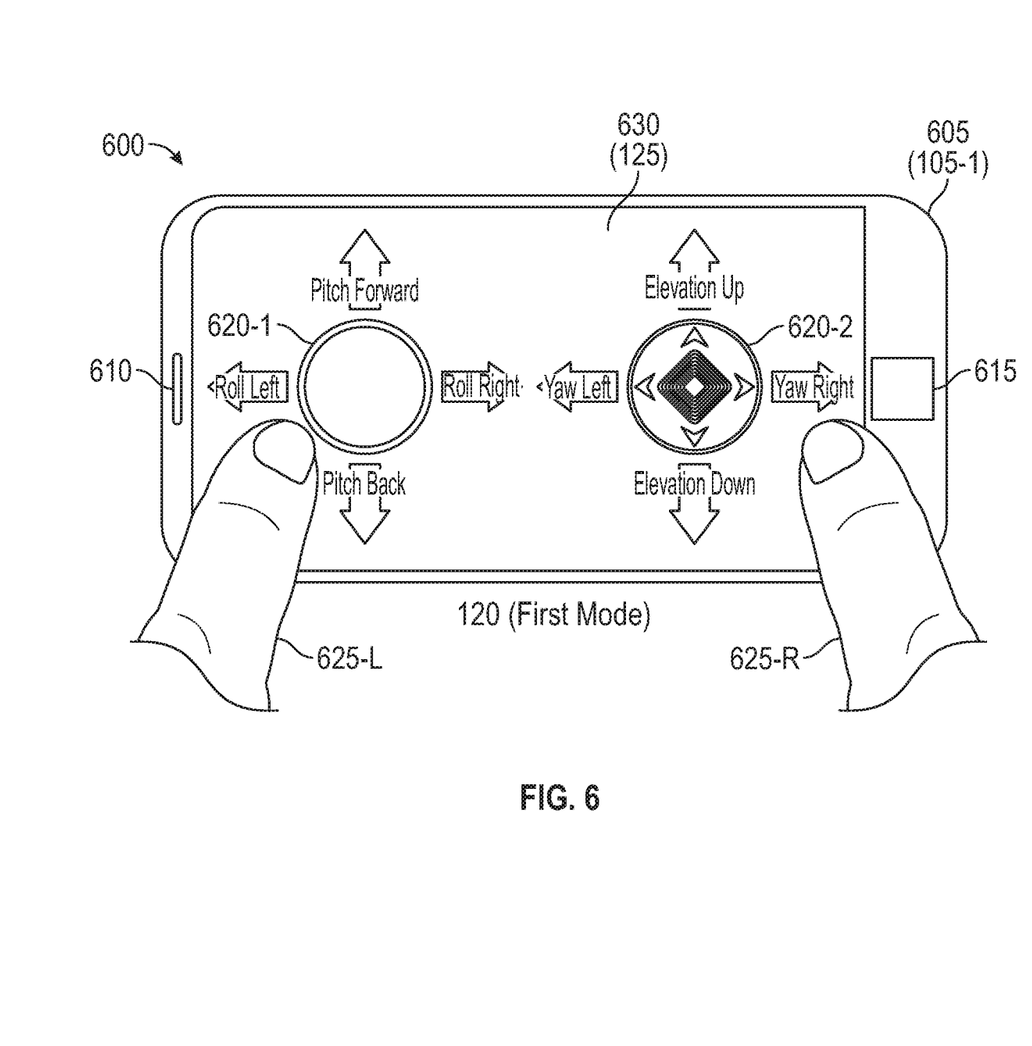
FIG. 6 illustrates an exemplary user interface displayed in a first mode for controlling motive operation of a battery-operated vehicle, according to one or more embodiments.

FIG. 6 illustrates an exemplary user interface 120 displayed in a first mode for controlling motive operation of a battery-operated vehicle, according to one or more embodiments. The features of diagram 600 may be used in conjunction with other embodiments, such as controlling the drone 405 of FIG. 4.

The diagram 600 includes a smartphone 605 as one example of the computing device 105-1 of FIG. 1. The smartphone 605 comprises a touch-enabled display 630 as one example of the display 125 of FIG. 1, as well as an earpiece speaker 610, and a button 615 for receiving input from a user. As shown, the user holds the smartphone 650 in a manner that allows the user's fingers 625-L, 625-R to provide input at the touch-enabled display 630.

A first input graphical element 620-1 and a second input graphical element 620-2 are displayed on the touch-enabled display 630. By pressing the finger 625-L on the touch-enabled display 630 in different directions relative to the first input graphical element 620-1, the user is able to control a pitch and a roll of the drone. In one example, a press to the right would roll the drone to the right. In another example, a press up and to the left would pitch the drone forward and roll the drone to the left. By pressing the finger 625-R on the touch-enabled display 630 in different directions relative to the second input graphical element 620-2, the user is able to control an elevation and a yaw of the drone.

Figure 7:
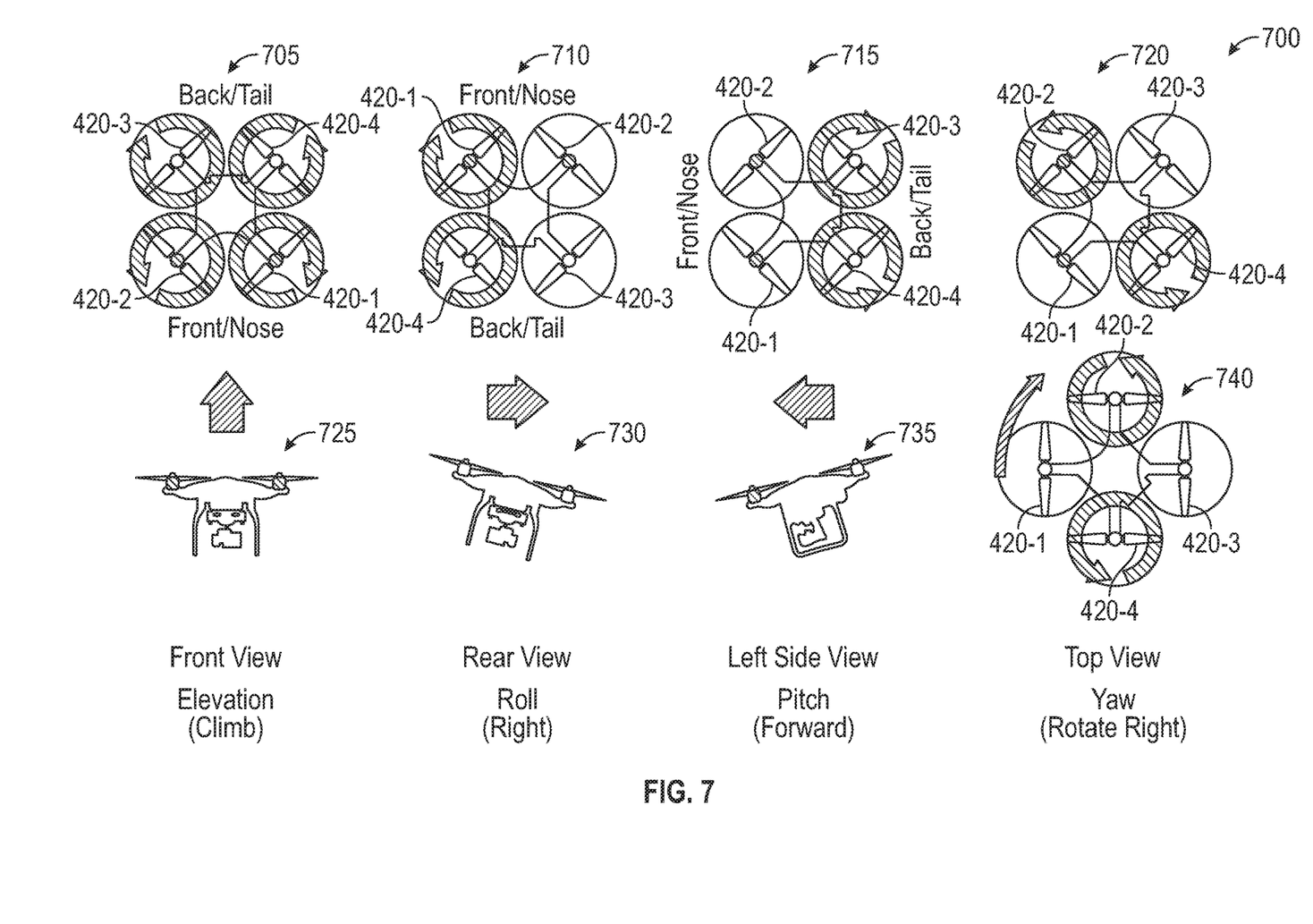
FIG. 7 illustrates exemplary motive operation of a battery-operated vehicle, according to one or more embodiments.

FIG. 7 illustrates exemplary motive operation of a battery-operated vehicle, according to one or more embodiments. The features of diagram 700 may be used in conjunction with other embodiments, such as controlling the drone 405 of FIG. 4 using the user interface 120 illustrated in FIG. 6.

The diagram 700 illustrates four different operations of the vehicle. A top view 705 and a front view 725 illustrate a first, increasing elevation (or climb) operation. The rotation speeds of the rotors 420-1, 420-3 (which are driven in a clockwise direction) are increased, and the rotation speeds of the rotors 420-2, 420-4 (which are driven in a counter-clockwise direction) are also increased. With the increased rotation speeds, the rotors 420-1, 420-2, 420-3, 420-4 generate additional lift and the elevation of the drone is increased as shown in the front view 725.

A top view 710 and a rear view 730 illustrate a second, roll right operation. The rotation speeds of the rotors 420-1, 420-4 are increased while the rotation speeds of the rotors 420-2, 420-3 are maintained or decreased. With the increased rotation speeds, the rotors 420-1, 420-4 generate additional lift and the drone rolls to the right as shown in the rear view 730.

Top views 720, 740 illustrate a third, yaw right operation. The rotation speeds of the rotors 420-2, 420-4 are increased while the rotation speeds of the rotors 420-1, 420-3 are maintained or decreased. With the increased rotation speeds, the rotors 420-1, 420-4 generate additional aerodynamic torque and the drone yaws in a clockwise direction as shown in the top view 740.

Figure 9:
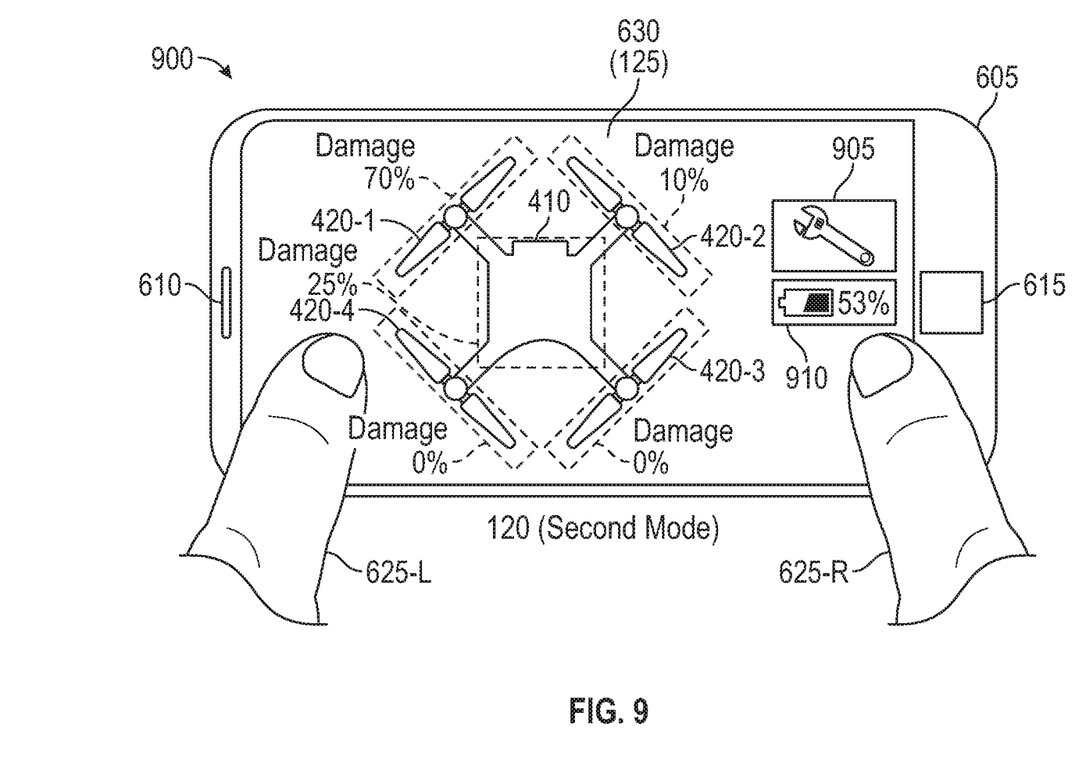
FIGS. 9 and 10 illustrate exemplary user interfaces displayed in a second mode while charging a battery-operated vehicle, according to one or more embodiments.
Figure 10:
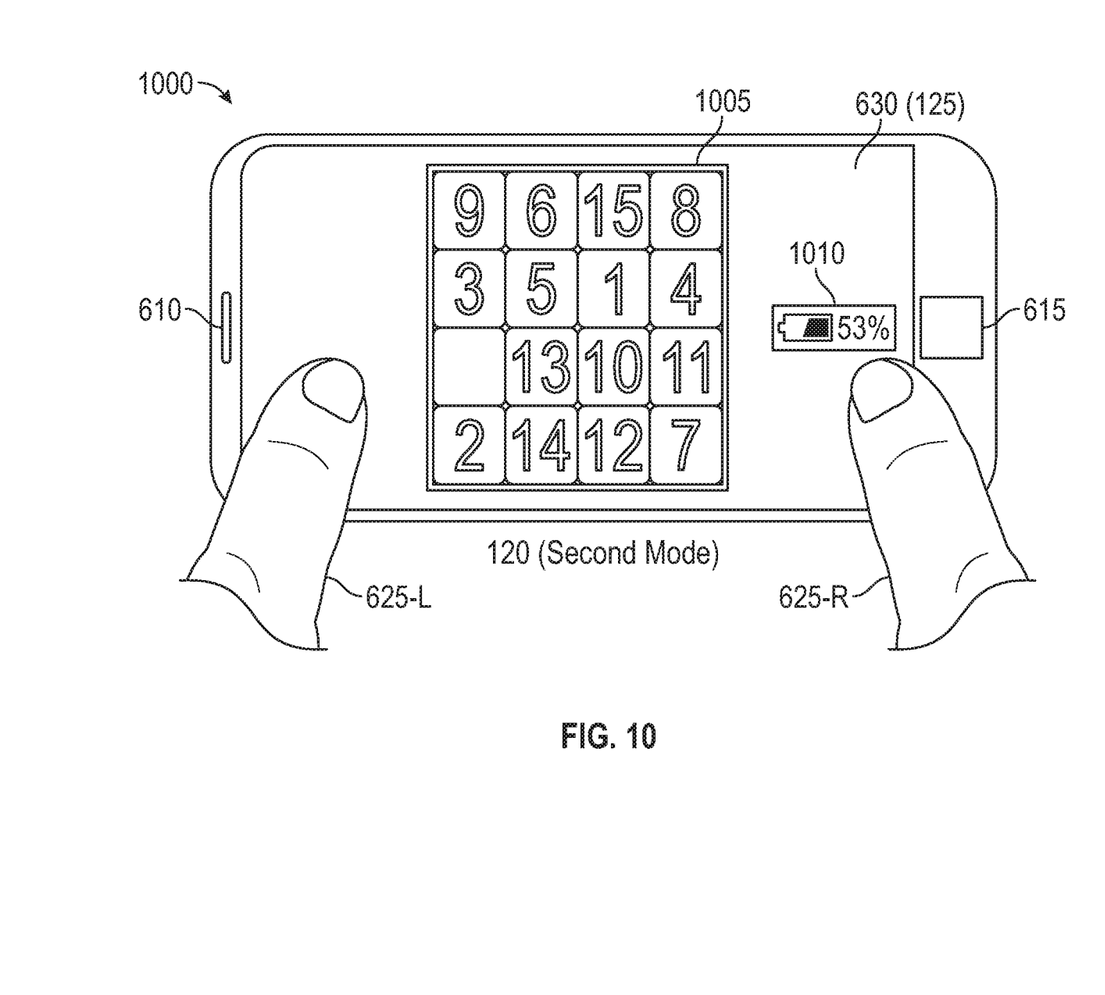

FIGS. 9 and 10 illustrate exemplary user interfaces 120 displayed in a second mode while charging a battery-operated vehicle, according to one or more embodiments. The features of diagrams 900, 1000 may be used in conjunction with other embodiments, such as being performed using the smartphone 605 of FIG. 6 while the drone 405 of FIG. 4 is being charged by a power supply.

The diagram 900 depicts a top view of the drone 405 displayed on the touch-enabled display 630 of the smartphone 605. Each rotor 420-1, 420-2, 420-3, 420-4 and the body 410 is associated with a virtual damage level, which may represent one or more collisions detected by sensors of the drone 405, virtual damage incurred during gameplay, and so forth. The rotor 420-1 is depicted as having 70% damage, the rotor 420-2 is depicted as having 10% damage, and rotors 420-3, 420-4 are depicted as having 0% damage. Further, the body 410 of the drone 405 is depicted as having a 25% damage. Other visual techniques for representing the virtual damage to the drone 405 are also contemplated, such as a heat map or other color coding scheme.

In the second mode, one or more tasks are displayed at the user interface 120. Based on the user's performance of the one or more tasks, the charging rate of the battery may be adjusted. Alternately, one or more other parameters may be controlled by the user's performance, such that a return to first mode (e.g., a vehicle control mode in which motive operation of the drone 405 is controlled) is accelerated or slowed.

More specifically, a graphical element 905 is displayed on the touch-enabled display 630. Thus, the displayed tasks are to repair the virtual damage to the various components of the drone 405. A user may press at the graphical element 905 to enable a repair function, and the user may begin repairing the virtual damage to the rotors 420-1, 420-2, 420-3, 420-4 and/or the body 410, e.g., by touching the depictions of each of the components. Other information may be displayed on the touch-enabled display 630, such as a graphical element 910 indicating a charge state of the battery (or a time remaining until a fully-charged state, etc.).

Based on the virtual repairs provided by the user through inputs at the user interface 120, the smartphone 605 may communicate a control signal to adjust a charging rate of the battery, or to adjust the one or more other parameters. For example, the charging rate may be increased or decreased responsive to the extent of the user's virtual repairs. In some embodiments, the reduction to the virtual damage levels caused by the virtual repairs is also reflected using the touch-enabled display 630. For example, the numerical values of the virtual damage levels may be decreased and/or a color changed responsive to the virtual repairs.

In other embodiments, the actual charging rate of the battery is not affected. In one example, a virtual charging rate of the battery is changed based on the virtual repairs and displayed to the user using the user interface 120, even where the actual charging rate is not affected. In another example, the user interface 120 may indicate that a delay will be imposed before resuming operation of the drone 405 in the first mode (e.g., the vehicle control mode). In some cases, the actual charging rate may be constrained or restrained by a battery controller (e.g., limited responsive to temperature measurements). In this way, user interest and/or user engagement with the vehicle is increased, as a user is thus incentivized to successfully perform or complete the one or more tasks to ensure that the drone 405 charges (or is otherwise returned to motive operation) as quickly as possible.

In another embodiment, the touch-enabled display 630 is used to provide augmented reality (AR) experiences for the user in the second mode. For example, while the drone 405 is charging, the user may spatially manipulate the smartphone 605 such that a camera of the smartphone 605 captures imagery of the drone 405. The smartphone 605 may display the imagery of the drone 405 using the touch-enabled display 630, as well as an overlay with a visual depiction of the virtual damage to the drone 405. For example, the diagram 900 could represent a top-down view of the drone 405 that is captured by the camera of the smartphone 605, and the different graphical elements such as the damage levels to the different rotors 420-1, 420-2, 420-3, 420-4 may be overlaid onto the imagery of the drone 405.

Although the diagram 900 illustrates the presentation of tasks within a game related to improving (repairing) the virtual operational condition of the drone 405, other games need not be related to the drone 405. The diagram 1000 depicts a graphical element 1005 as a sliding puzzle that is completed when the puzzle numbers 1-15 are arranged in a sequential order. Other information may be displayed on the touch-enabled display 630, such as a graphical element 1010 indicating a charge state of the battery (or a time remaining until a fully-charged state, etc.).

Thus, the displayed task is to arrange the puzzle numbers are in the sequential order. Based on user inputs to the touch-enabled display 630 (that is, rearranging the puzzle numbers), the smartphone 605 communicates a control signal to adjust a charge rate of the battery or to adjust the one or more other parameters. The control signal may be based on a successful completion of the puzzle (e.g., a binary yes or no), how long the user took to complete the puzzle, the user's progress with the puzzle during a period, and so forth. Other types of games are also possible. For example, educational questions or trivia questions may be presented at the user interface 120, and the control signal may be based on the user's responses.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   while a battery-operated vehicle is not being charged by a power supply, operating a user interface displayed on a computing device in a first mode;
   responsive to receiving a first input at the user interface while in the first mode, wirelessly transmitting a first control signal to the battery-operated vehicle to control motive operation thereof;
   responsive to receiving an indication that the battery-operated vehicle is being charged by the power supply, operating the user interface in a second mode in which one or more tasks are displayed;
   responsive to receiving one or more second inputs at the user interface while in the second mode, assessing performance of the one or more tasks; and
   wirelessly transmitting, to the battery-operated vehicle, a second control signal that is based on the assessed performance of the one or more tasks.

2. The method of claim 1, wherein the battery-operated vehicle comprises a controller and a battery, and
   wherein the second control signal configures the controller to adjust a charging rate of the battery.

3. The method of claim 1, wherein the second control signal operates one or more output devices of the battery-operated vehicle to momentarily operate a drive element of the battery-operated vehicle without disrupting a coupling of the power supply with the battery-operated vehicle.

4. The method of claim 1,
   wherein operating the user interface in the first mode comprises displaying at least a first graphical element that controls the motive operation, wherein the first input is received at the first graphical element; and
   wherein operating the user interface in the second mode comprises displaying at least a second graphical element that does not control the motive operation, wherein the second input is received at the second graphical element.

5. The method of claim 4, further comprising:
   during the motive operation, receiving a sensor input from a sensor of the battery-operated vehicle;
   wherein one or more graphical elements displayed in the second mode are based on the sensor input.

6. The method of claim 1, wherein the one or more tasks relate to a virtual operational condition of the battery-operated vehicle.

7. The method of claim 6, further comprising:
   during the motive operation, receiving a sensor input from a sensor of the battery-operated vehicle;
   detecting a collision of the battery-operated vehicle using the sensor input; and
   assigning a virtual damage level to the battery-operated vehicle responsive to the collision,
   wherein performance of the one or more tasks operates to reduce the virtual damage level.

8. The method of claim 1, wherein assessing the performance of the one or more tasks comprises one or more of the following:
   whether a first task of the one or more tasks was successfully completed;
   a length of time to successfully complete the first task; and
   a progress of the first task within a period.

9. A computer program product comprising a computer-readable storage medium having program instructions embodied therewith, the program instructions executable by one or more computer processors to perform an operation for controlling operation of a battery-operated vehicle, the operation comprising:
   displaying a user interface at a display coupled with the one or more computer processors;
   while the battery-operated vehicle is not being charged by a power supply, operating the user interface in a first mode;
   responsive to receiving a first input at the user interface while in the first mode, wirelessly transmitting a first control signal to the battery-operated vehicle to control motive operation thereof;
   responsive to receiving an indication that the battery-operated vehicle is being charged by the power supply, operating the user interface in a second mode in which one or more tasks are displayed;
   responsive to receiving one or more second inputs at the user interface while in the second mode, assessing performance of the one or more tasks; and
   wirelessly transmitting, to the battery-operated vehicle, a second control signal that is based on the assessed performance of the one or more tasks.

10. The computer program product of claim 9, wherein the battery-operated vehicle comprises a controller and a battery, and
    wherein the second control signal configures the controller to adjust a charging rate of the battery.

11. The computer program product of claim 9, wherein the second control signal operates one or more output devices of the battery-operated vehicle to momentarily operate a drive element of the battery-operated vehicle without disrupting a coupling of the power supply with the battery-operated vehicle.

12. The computer program product of claim 9,
    wherein operating the user interface in the first mode comprises displaying at least a first graphical element that controls the motive operation, wherein the first input is received at the first graphical element; and
    wherein operating the user interface in the second mode comprises displaying at least a second graphical element that does not control the motive operation, wherein the second input is received at the second graphical element.

13. The computer program product of claim 12, the operation further comprising:
    during the motive operation, receiving a sensor input from a sensor of the battery-operated vehicle;
    wherein one or more graphical elements displayed in the second mode are based on the sensor input.

14. A system comprising:
    a battery-operated vehicle comprising:
       a battery;
       a charging interface coupled with the battery; and
       a communications interface;
    a power supply configured to couple with the charging interface;
    a display; and
    one or more computer processors configured to:
       display a user interface using the display;
       while the battery is not being charged by the power supply, operate the user interface in a first mode;
       responsive to receiving a first input at the user interface while in the first mode, wirelessly transmit a first control signal to the communications interface to control motive operation of the battery-operated vehicle;

responsive to receiving an indication that the battery is being charged by the power supply, operate the user interface in a second mode in which one or more tasks are displayed;

responsive to receiving one or more second inputs at the user interface while in the second mode, assess performance of the one or more tasks; and wirelessly transmit, to the communications interface, a second control signal that is based on the assessed performance of the one or more tasks.

15. The system of claim 14, wherein the display and the one or more computer processors are included in a mobile computing device.

16. The system of claim 14, wherein the battery-operated vehicle further comprises:

a controller coupled with the battery, wherein the second control signal configures the controller to adjust a charging rate of the battery.

17. The system of claim 14, wherein the battery-operated vehicle further comprises an output device, and wherein the second control signal operates output device to momentarily operate a drive element of the battery-operated vehicle without disrupting a coupling of the power supply with the battery-operated vehicle.

18. The system of claim 14, wherein operating the user interface in the first mode comprises displaying at least a first graphical element that controls the motive operation, wherein the first input is received at the first graphical element; and wherein operating the user interface in the second mode comprises displaying at least a second graphical element that does not control the motive operation, wherein the second input is received at the second graphical element.

19. The system of claim 18, wherein the battery-operated vehicle further comprises:

a sensor, wherein the one or more computer processors are further configured to:

during the motive operation, receiving a sensor input from the sensor, wherein one or more graphical elements displayed in the second mode are based on the sensor input.

20. The system of claim 19, wherein the sensor comprises an inertial measurement unit.

\* \* \* \* \*